United States Patent [19]

Gartner

[11] Patent Number: 4,535,833
[45] Date of Patent: Aug. 20, 1985

[54] VERTICAL MULLION HAVING HEAT TRANSFER MEDIUM FLOW PASSAGE

[75] Inventor: Karl Gartner, Gundelfingen, Fed. Rep. of Germany

[73] Assignee: Yoshida Kogyo K. K., Tokyo, Japan

[21] Appl. No.: 521,970

[22] Filed: Aug. 10, 1983

[30] Foreign Application Priority Data

Aug. 10, 1982 [JP] Japan .................. 57-121466[U]

[51] Int. Cl.³ .............................................. F24D 5/10
[52] U.S. Cl. ........................................ 165/53; 52/731; 62/263
[58] Field of Search .............. 165/53; 62/263; 52/209, 52/235, 731, 302, 303

[56] References Cited

U.S. PATENT DOCUMENTS

| | | | |
|---|---|---|---|
| 1,882,719 | 10/1932 | Armstrong | 165/53 |
| 2,035,653 | 3/1936 | Haskell | 62/263 |
| 3,003,290 | 10/1961 | Lerner | 52/731 X |
| 3,296,820 | 1/1967 | Bauman | 62/263 |
| 3,415,024 | 12/1968 | Kotlarz | 165/49 X |
| 3,795,272 | 3/1974 | Kahn et al. | 165/54 |
| 4,007,574 | 2/1977 | Riddell | 52/731 X |
| 4,103,598 | 8/1978 | Cooper | 165/53 |
| 4,203,487 | 5/1980 | Gartner | 165/53 |
| 4,314,544 | 2/1982 | Müller | 165/53 |
| 4,355,682 | 10/1982 | Maloney | 165/53 |

FOREIGN PATENT DOCUMENTS

| | | | |
|---|---|---|---|
| 2244022 | 3/1973 | Fed. Rep. of Germany | 52/731 |
| 2352133 | 12/1977 | France | 52/731 |

Primary Examiner—Stephen F. Husar
Attorney, Agent, or Firm—Hill, Van Santen, Steadman & Simpson

[57] ABSTRACT

A vertical mullion includes an outer structural member and a vertical mullion body coupled together by bolts to embrace a heat insulating member. The vertical mullion body, which has a substantially rectangular cross section, is provided with a heat transfer medium flow passage extending depthwise through the interior thereof. The vertical mullion body has a lower end portion extending below from a connecting portion to a fastener which is mounted to a floor slab, and the lower end portion is connected to a feed pipe and/or a drain pipe.

3 Claims, 4 Drawing Figures

4,535,833

VERTICAL MULLION HAVING HEAT TRANSFER MEDIUM FLOW PASSAGE

BACKGROUND OF THE INVENTION

This invention relates to a vertical mullion having a heat transfer medium flow passage for a building equipped with an air conditioning system.

In a building equipped with an air conditioning system, cooling and heating of the building interior are carried out by passing cool or warm water through a piping system. A problem encountered in implementing such cooling and heating is how to dispose or arrange the pipes, namely the passages through which the heat transfer medium, such as water, flows.

By way of example, in a building of the type having a curtain wall composed of vertical mullions and horizontal transoms, an air conditioning system can be constructed by providing the heat transfer medium flow passages interiorly of the vertical mullions or transoms. However, since a fastener for securing the curtain wall to the building is attached to the vertical mullions of the curtain wall, a problem arises concerning the positional relationship between the heat transfer medium flow passages and the fasteners. For example, if a flow passage is provided along the wall of a room interior, a problem will be encountered concerning the positions at which the fasteners are to be attached, and difficulty will be experienced in laying the water feed and drain pipes connected to the flow passages. In addition, heating and cooling efficiency is poor owing to the irregular temperature distribution of the heat radiating and absorbing surfaces of the vertical mullions. Problems are also encountered in extruding the profile for the vertical mullions.

SUMMARY OF THE INVENTION

It is an object of the present invention to solve the foregoing problems encountered in the prior art and provide a vertical mullion incorporating a heat transfer medium flow passage, which vertical mullion exhibits excellent extrudability and facilitates the piping connections between the heat transfer medium flow passage and water feed and drain pipes.

The vertical mullion of the present invention includes an outer structural member and a vertical mullion body coupled together by bolts to embrace a heat insulating member. The vertical mullion body, which has a substantially rectangular cross section, is provided with a heat transfer medium flow passage extending depthwise through the interior thereof. The vertical mullion body has a lower end portion extending below from a connecting portion to a fastener which is mounted to a floor slab, and the lower end portion is connected to a feed pipe and/or a drain pipe.

DESCRIPTION OF THE PREFERRED EMBODIMENT

Figure 1:
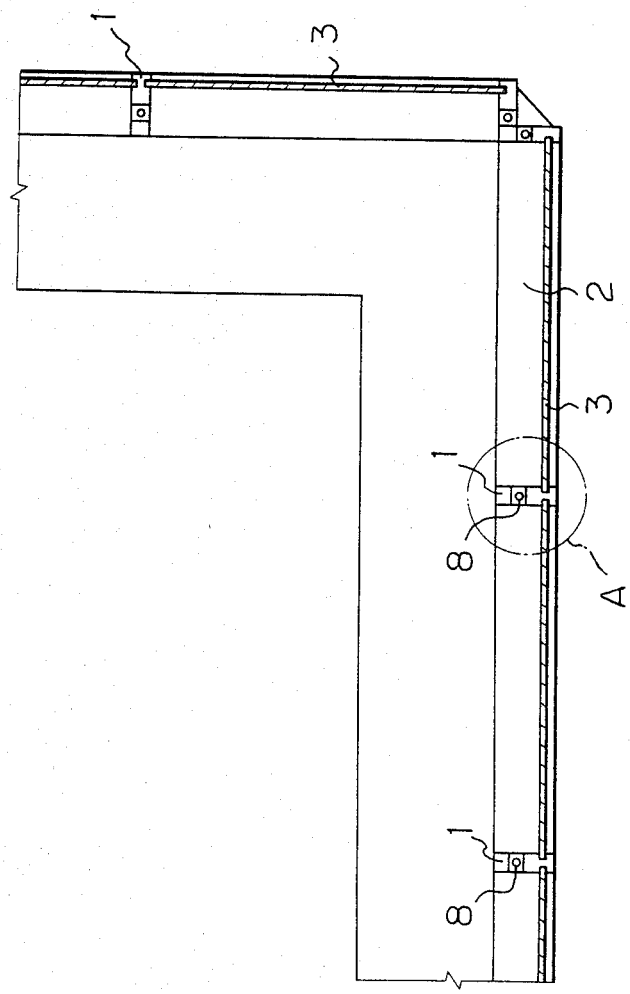
FIG. 1 is a schematic view illustrating the arrangement of vertical mullions according to the present invention.
Figure 2:
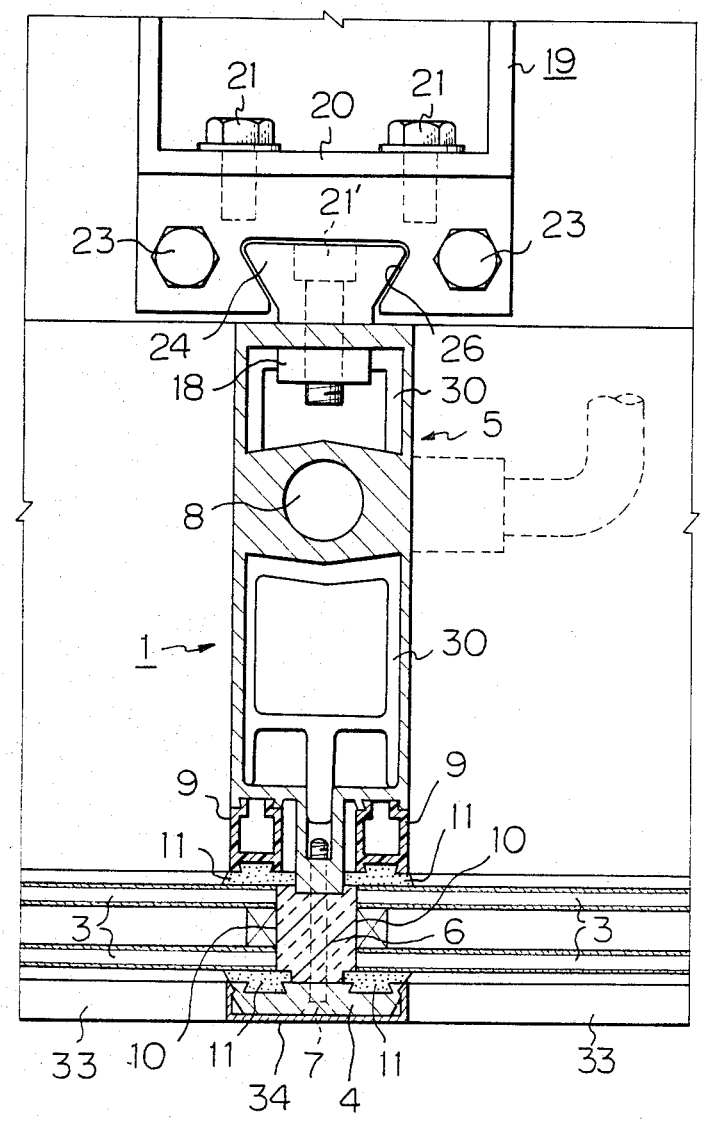
FIGS. 2 and 3 are enlarged views of the encircled portion shown in FIG. 1, each illustrating a different embodiment of the present invention.
Figure 3:
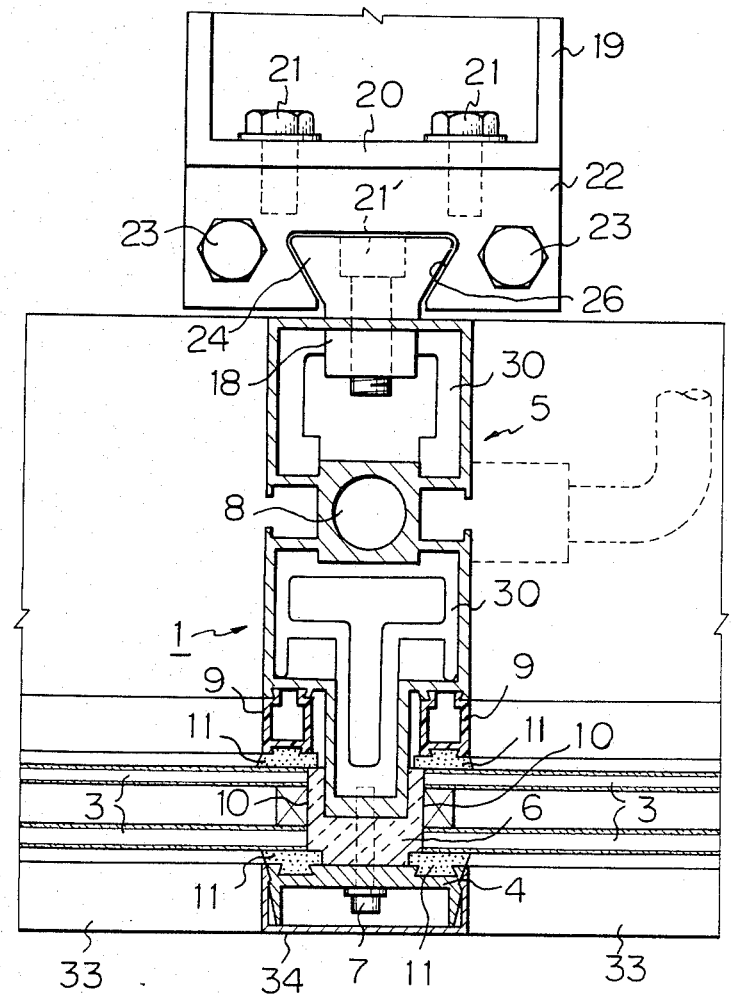

Referring to FIG. 1, numeral 1 denotes a vertical mullion in accordance with the present invention, 2 a transom, and 3 an arrangement of double glass panes. As shown in FIGS. 2 and 3, the vertical mullion 1 comprises an outer structural member 4 and a vertical mullion body 5 coupled together by a coupling bolt 7 to embrace a heat insulating member 6. The vertical mullion body 5 has a substantially rectangular cross section and is provided centrally with a heat transfer medium flow passage 8 extending depthwise as viewed in the drawing.

The heat insulating member 6, which is embraced between the vertical mullion body 5 and outer structural member 4 coupled together by the bolt 7 as described above, has the double glass panes 3, 3 secured on either side thereof. Specifically, the double glass panes 3 have their edge portions fixedly secured, through gaskets 11, 11, in a mounting channel 10 formed by the outer structural member 4, the insulating member 6, and an attachment 9 fitted in the vertical mullion body 5.

Figure 4:
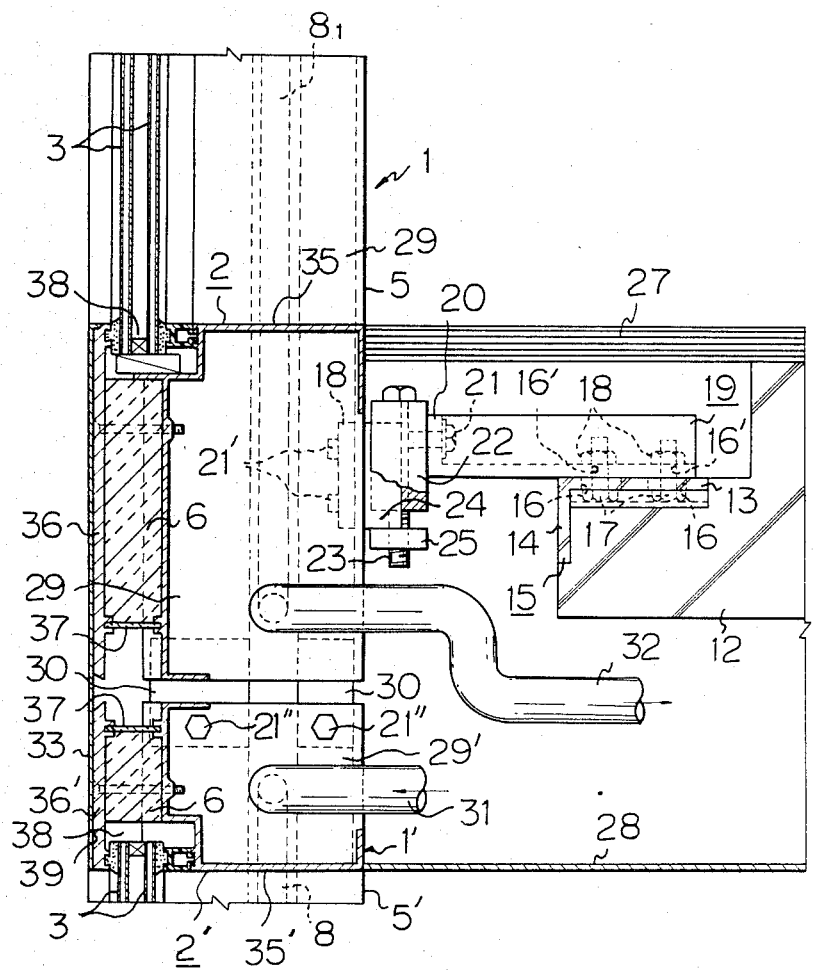
FIG. 4 is a longitudinal sectional view showing how a vertical mullion is attached.

Reference will now be had to FIG. 4 to describe the manner in which the vertical mullion 1 is attached.

A substantially reverse L-shaped first fastener 15 is disposed on a floor slab 12 via a mounting portion 13 and base portion 14 thereof. Oblong adjustment holes 16, 16 are drilled through the base portion 14 of the first fastener 15, and connecting bolts 17, 17 are inverted and passed through the respective holes 16, 16. A second fastener 19 having oblong adjustment holes 16', 16' is fitted over the bolts 17, 17 so that the bolts pass through the holes 16', 16', these being substantially perpendicular to the oblong adjustment holes 16, 16 of the first fastener 15. The second fastener 19 is coupled snugly to the first fastener 15 and is capable of being positionally adjusted in the direction perpendicular to the plane of the drawing by the length of the oblong adjustment holes 16, 16, and to the left and right in FIG. 4 by the length of the oblong adjustment holes 16', 16'. The first and second fasteners 15, 19 are securely welded together following the above-mentioned adjustments.

The second fastener 19 has a base plate 20 through which connecting bolts 21, 21 are passed. The connecting bolts 21, 21 are scrrewed into a third fastener 22 to connect the second fastener 19 to the third fastener 22. The third fastener 22 is provided with adjustment bolts 23, 23 that are screwed into a movable plate 25 of the third fastener 22. The movable plate 25 can be moved up or down by turning the adjustment bolts 23, 23, thereby raising and lowering a fourth fastener 24 to adjust the vertical position of the vertical mullion. Following this adjustment, both fasteners are firmly secured as by welding.

As shown in FIGS. 2 and 3, the connection between the fourth fastener 24 and third fastener 22 is effected by fitting the fourth fastener 24, having a bracket-type configuration, into a dovetail groove 26 of the third fastener 22. Thus, the fourth fastener 24 is capable of vertical movement but is incapable of moving horizontally. The fourth fastener 24 is secured to the vertical mullion body 5 by bolts 21', 21' and a backing plate 18.

Thus, through the foregoing steps, the vertical mullion 1 is secured to the floor slab 12 between a floor plate 27 and a ceiling plate 28. The connection between vertical mullions 1, 1' is also effected between the floor plate 27 and ceiling plate 28. Specifically, a sleeve 30 is inserted into spaces 29, 29' between confronting vertical mullion bodies 5, 5', and the vertical mullion body 5' is fixedly connected to the sleeve 30 by bolts 21'', 21''. The other vertical mullion body 5 is free for vertical movement relative to the sleeve 30 so as to be capable of accommodating relative vertical displacement.

A feed water pipe 31 is connected to the upper portion of the vertical mullion bodies 5, 5' and communicates with the heat transfer medium flow passage 8 within the vertical mullions 1, 1'. A drain pipe 32 is connected to the lower portion of the vertical mullion bodies 5, 5' and similarly communicates with the heat transfer medium flow passage 8. Thus, a heat transfer medium such as warm water or cool water flows in from the feed water pipe 31 and out through the drain pipe 32 via the heat transfer medium flow passage 8, so that the vertical mullions perform the function of a building cooling and heating system.

The manner in which the transoms 2, 2' are joined may be understood from FIG. 4. Each transom 2, 2' is formed by coupling a transom body 35 (35') to an outer structural member 36 with an insulating member 37 interposed therebetween. The double glass panes 3 are secured within a mounting channel 38 of the upper transom 2, and within a mounting channel 38' of the lower transom 2', the glass panes extending downwardly in the latter case. The outer structural members 36, 36, constituting essential constituents of the upper transom 2 and lower transom 2', respectively, are covered by an outer batten 33. The outer batten 33 is anchored to the outer structural member 36 and is brought into intimate contact with the outer structural member 36' through the intermediary of a sealing member 39. Such an arrangement makes it possible to accommodate relative displacement. As shown in FIG. 3, the exterior side of the outer structural member constituting the vertical mullions 1, 1' is covered by a vertical mullion cover 34.

Since a vertical mullion according to the present invention is provided with the heat transfer medium flow passage 8 extending depthwise through the center of the vertical mullion 1, the temperature distribution on the heat radiating side of the vertical mullion becomes substantially the same as that on the heat absorbing side thereby improving the efficiency of heat radiation and absorption by a wide margin to facilitate the effectiveness of room heating and cooling. In addition, vertical mullions can be manufactured with improved extrudability. Further, since a heat insulating member is provided between the vertical mullion body and the outer structural member, heat irradiation towards the outside of the building is prohibited and therefore, high efficiency for heating or cooling the interior of the building can be obtained.

With a vertical mullion according to the present invention, the portion having the heat transfer medium flow passage interiorly of the room can be used to secure the vertical mullion by means of a fastener, and the flow passage and fastener do not interfere with each other. This permits the fastener to be secured at the optimum position for connection to the building wall member, namely a portion of the building skeleton such as a floor plate. Furthermore, since the connection between the heat transfer medium flow passage and the water feed and drain pipes is effected below the location of the fastener, the piping operation is facilitated and the arrangement of the pipes connected to the flow passage is excellent. This reduces feed water heat loss and improves heating and cooling efficiency.

Although a certain preferred embodiment has been shown and described, it should be understood that many changes and modifications may be made therein without departing from the scope of the appended claims.

What is claimed is:

1. A vertical mullion comprising an outer structural member and a vertical mullion body coupled together by coupling means and embracing a heat insulating member therebetween, said vertical mullion body being an integrally extruded member having a generally rectangular cross-section and a heat transfer medum passage integrally set in a central portion thereof, one end portion of said mullion body being adapted to receive said coupling means, and the other end portion of said mullion body having a bracket means disposed for vertically slidable movement in a stationary fastener.

2. The vertical mullion of claim 1, wherein said vertical mullion body is connected to a fastener mounted to a floor slab by bolts.

3. The vertical mullion of claim 2, wherein said vertical mullion body has a lower end portion extending below said fastener, said lower end portion being connected to a heat transfer medium flow pipe.

* * * * *